US010539221B2

(12) United States Patent
Toyama et al.

(10) Patent No.: US 10,539,221 B2
(45) Date of Patent: Jan. 21, 2020

(54) CASING STRUCTURE OF VEHICULAR POWER TRANSMITTING DEVICE

(71) Applicant: TOYOTA JIDOSHA KABUSHIKI KAISHA, Toyota-shi, Aichi (JP)

(72) Inventors: Shingo Toyama, Nisshin (JP); Kazutoshi Motoike, Okazaki (JP); Shinya Kuwabara, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/201,125

(22) Filed: Nov. 27, 2018

(65) Prior Publication Data
US 2019/0162290 A1    May 30, 2019

(30) Foreign Application Priority Data
Nov. 28, 2017    (JP) .................................. 2017-228385

(51) Int. Cl.
*F16H 57/027* (2012.01)
*F16H 57/029* (2012.01)

(52) U.S. Cl.
CPC ......... *F16H 57/027* (2013.01); *F16H 57/029* (2013.01)

(58) Field of Classification Search
CPC ............................. F16H 57/027; F16H 57/029
See application file for complete search history.

(56) References Cited

U.S. PATENT DOCUMENTS

| 8,887,870 B2 * | 11/2014 | Okada | F16H 57/027 184/6.23 |
| 2009/0000874 A1 | 1/2009 | Okada et al. | |
| 2009/0324381 A1 * | 12/2009 | Arnold | F02B 29/0475 415/1 |
| 2011/0173935 A1 * | 7/2011 | Tesner | F16H 57/027 55/385.3 |
| 2014/0014662 A1 * | 1/2014 | Hensel | F16H 57/027 220/367.1 |
| 2018/0087646 A1 * | 3/2018 | Matsumoto | F16H 57/027 |
| 2018/0280850 A1 * | 10/2018 | Inaba | B01D 45/08 |

FOREIGN PATENT DOCUMENTS

| CN | 101663510 A | 3/2010 |
| EP | 2472106 A1 | 7/2012 |
| JP | S62-158251 U | 10/1987 |
| JP | H02-113072 U | 9/1990 |
| JP | 2007-064425 A | 3/2007 |
| WO | 2011/024670 A1 | 3/2011 |

* cited by examiner

*Primary Examiner* — Vicky A Johnson
(74) *Attorney, Agent, or Firm* — Oliff PLC

(57) ABSTRACT

A casing structure of a vehicular power transmitting device, includes: a casing; a breather plug; and a stationary removal preventive member, wherein the breather plug includes an attaching portion and a body portion, the body portion of the breather plug including an abutting section which abuts on the removal preventive member when the attaching portion of the breather plug is moved relative to the communication hole in a direction toward the outside atmosphere. The removal preventive member is positioned relative to the communication hole such that the attaching portion of the breather plug is located to keep the breather plug in communication with the communication hole when the abutting section of the body portion comes into abutting contact with the removal preventive member.

12 Claims, 1 Drawing Sheet

CASING STRUCTURE OF VEHICULAR POWER TRANSMITTING DEVICE

This application claims priority from Japanese Patent Application No. 2017-228385 filed on Nov. 28, 2017, the disclosure of which is herein incorporated by reference in its entirety.

FIELD OF THE INVENTION

The present invention relates generally to a casing of a vehicular power transmitting device, and more particularly to a casing structure which prevents removal of a breather plug from the casing.

BACKGROUND OF THE INVENTION

There is known a casing of a vehicular power transmitting device, which is provided with a breather plug which is held in communication with a communication hole formed in the casing and through which an inside space within the casing is open to an outside atmosphere outside the casing. JP2007-64425A discloses an example of such a casing of the vehicular power transmitting device. In the casing disclosed in this publication, the breather plug is provided with a pressure adjusting filter disposed within a passage formed therethrough, so that the breather plug permits only the air to flow through the passage, without flows of oily substances and other foreign matters through the passage. JP2-113072U, JP62-158251U and WO2011/024670 disclose similar prior art breather plugs of the type as described above.

By the way, the breather plug disclosed in JP2007-64425A is screwed to the casing, for preventing removal of the breather plug from the casing. Accordingly, the casing is required to have a threaded portion, so that the threaded portion is required to have a relatively large wall thickness. JP2-113072U discloses an example of a breather plug formed with a removal preventive flange for preventing removal of the breather plug from the casing. This type of breather plug having the integrally formed removal preventive flange has a problem that its length tends to be relatively large.

SUMMARY OF THE INVENTION

The present invention was made in view of the background art described above. It is therefore an object of the present invention to provide a casing structure of a vehicular power transmitting device, which includes a casing and a breather plug attached to the casing, and which is constructed to prevent removal of the breather plug from the casing, without a need of providing an exclusive mechanism between the breather plug and a communication hole formed through the casing.

The object indicated above is achieved according to the following modes of the present invention:

According to a first mode of the invention, there is provided a casing structure of a vehicular power transmitting device, comprising: a casing; a breather plug through which an inside space within the casing is open to an outside atmosphere outside the casing; and a stationary removal preventive member for preventing removal of the breather plug from the casing, wherein the breather plug includes an attaching portion fitted in a communication hole which is formed through the casing, for communication between the inside space and the outside atmosphere, and a body portion located on an upper side of the communication hole and held in communication with the outside atmosphere when the attaching portion is attached in the communication hole, the body portion of the breather plug including an abutting section which abuts on the removal preventive member when the attaching portion of the breather plug is moved relative to the communication hole in a direction toward the outside atmosphere. The removal preventive member is positioned relative to the communication hole such that the attaching portion of the breather plug is located to keep the breather plug in communication with the communication hole when the abutting section of the body portion comes into abutting contact with the removal preventive member.

According to a second mode of the invention, the body portion of the breather plug includes a projecting section projecting from the casing, and a connecting section connecting the projecting section and the attaching portion, and the removal preventive member is positioned so as to permit the connecting section to be moved when the attaching portion is moved relative to the communication hole. The abutting section is located in a part of the connecting section such that the abutting section abuts on the removal preventive member when the attaching portion is moved relative to the communication hole.

According to a third mode of the invention, the removal preventive member is fixed to the casing.

According to a fourth mode of the invention, a sealing member is interposed between an outer circumferential surface of the attaching portion of the breather plug and an inner circumferential surface of the communication hole.

According to a fifth mode of the invention, the projecting section of the body portion of the breather plug projects in an upward direction when the vehicular power transmitting device is installed in position on a vehicle.

In the casing structure of the vehicular power transmitting device according to the first mode of the invention, the body portion of the breather plug includes the abutting section which abuts on the stationary removal preventive member when the attaching portion of the breather plug is moved relative to the communication hole in the direction toward the outside atmosphere. This removal preventive member is positioned relative to the communication hole such that the attaching portion of the breather plug is located to keep the breather plug in communication with the communication hole when the abutting section comes into abutting contact with the removal preventive member. Accordingly, even when the breather plug is moved relative to the communication hole in the direction away from the communication hole, the breather plug is prevented from being removed from the casing, owing to the abutting contact of the abutting section of the body portion of the breather plug on the removal preventive member. Thus, it is possible to prevent the removal of the breather plug from the casing of the vehicular power transmitting device, without a need of providing an exclusive mechanism between the attaching portion of the breather plug and the communication hole of the casing.

In the casing structure according to the second mode of the invention, the abutting section is located in the selected part of the connecting section such that the abutting section abuts on the removal preventive member when the attaching portion is moved relative to the communication hole. Accordingly, the abutting section comes into abutting contact with the removal preventive member when the breather plug is moved relative to the communication hole in the direction away from the communication hole, so that the breather plug is prevented from being removed from the casing.

In the casing structure according to the third mode of the invention, the removal preventive member is fixed to the casing, as an integral part of the casing. This removal preventive member may be a member provided in the known power transmitting device, to perform a given function, for instance, to function as a member for fixing a shift cable used in the power transmitting device. In this case, the number of required components of the power transmitting device including the removal preventive member can be reduced.

In the casing structure according to the fourth mode of the invention, the sealing member is interposed between the outer circumferential surface of the attaching portion of the breather plug and the inner circumferential surface of the communication hole, so that the attaching portion of the breather plug is air-tightly held in communication with the communication hole.

In the casing structure according to the fifth mode of the invention, the projecting section of the body portion of the breather plug projects in the upward direction when the vehicular power transmitting device is installed in position on the vehicle. Accordingly, an oil accommodated within the casing is prevented from being discharged into the outside atmosphere through the breather plug.

DETAILED DESCRIPTION OF PREFERRED EMBODIMENT

A preferred embodiment of the present invention will be described in detail by reference to the drawings. It is to be understood that the drawings showing the embodiments are simplified or transformed as needed, and do not necessarily accurately represent dimensions and shapes of various elements of the embodiments.

Embodiment

Figure 1:
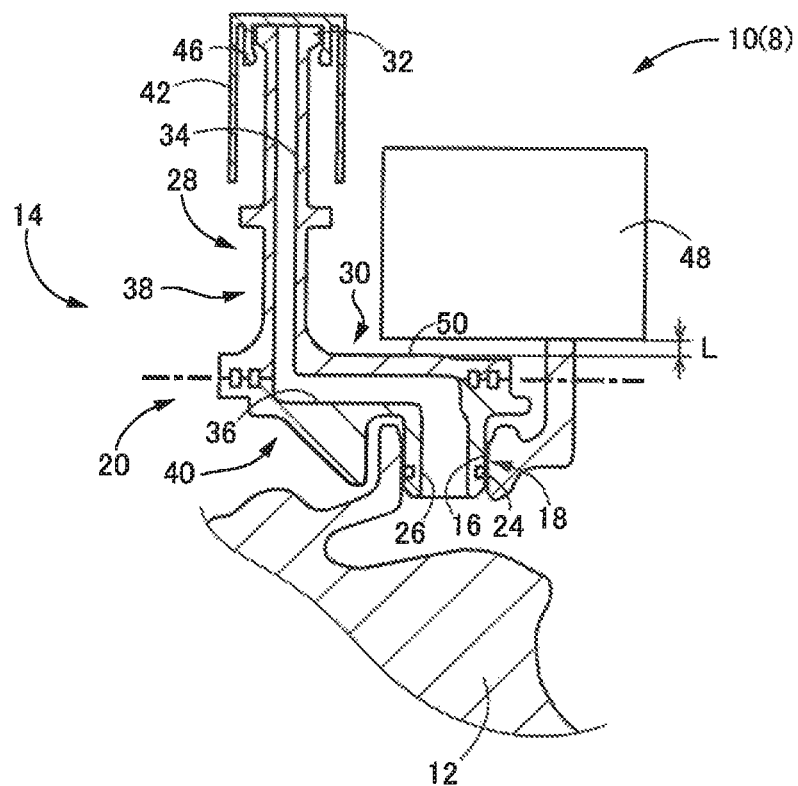
FIG. 1 is a cross sectional view showing a portion of a power transmitting device of a vehicle, more particularly, a portion of a casing structure of the power transmitting device according to one embodiment of this invention, which casing structure includes a stationary casing and a breather plug fixed to the casing.
Figure 2:
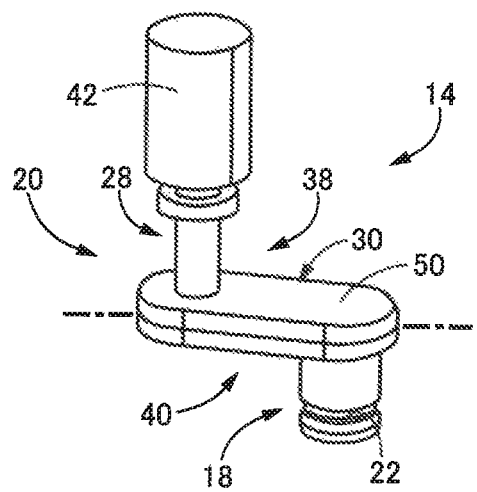
FIG. 2 is a perspective view of the breather plug shown in FIG. 1.

FIG. 1 is the cross sectional view showing a portion of a power transmitting device 10 of a vehicle 8, more particularly, a portion of a casing structure of the power transmitting device 10 according to one embodiment of this invention, which casing structure includes a stationary casing 12 and a breather plug 14 fixed to the casing 12. FIG. 2 is the perspective view of the breather plug 14. The breather plug 14 is provided so that an inner space within the casing 12 is open to an outside atmosphere outside the casing 12. The cross sectional view of FIG. 1 is taken in a vertical plane when the vehicle 8 is held stationary on a horizontal roadway or ground surface.

The casing 12 has a communication hole 16 for communication between its inner space and the outside atmosphere. The communication hole 16 is formed such that its centerline extends in the vertical direction when the power transmitting device 10 is installed on the vehicle 8 held stationary on the horizontal roadway or ground surface. Namely, the casing 12 has a predetermined posture with the communication hole 16 extending in the vertical direction, when the power transmitting device 10 is installed on the vehicle 8 held stationary on the horizontal roadway or ground surface.

The breather plug 14 includes a attaching portion 18 fitted in the communication hole 16, and a body portion 20 which is located on an upper side of the communication hole 16 and in the outside atmosphere outside the casing 12 when the attaching portion 18 is attached in the communication hole 16.

The attaching portion 18 is a cylindrical portion fitted in the communication hole 16 such that the attaching portion 18 extends in the vertical direction when the power transmitting device 10 is placed in its horizontal posture. The attaching portion 18 has an outside diameter determined such that an outer circumferential surface of the attaching portion 18 fitted in the communication hole 16 is slidable on an inner circumferential surface of the communication hole 16. The attaching portion 18 has an annular groove 22 formed in its outer circumferential surface, and an O-ring 24 is fitted in the annular groove 22. This O-ring 24 fitted in the annular groove 22 of the attaching portion 18 fitted in the communication hole 16 is interposed between the outer circumferential surface of the attaching portion 18 and the inner circumferential surface of the communication hole 16, so that the attaching portion 18 is air-tightly held in communication with the communication hole 16. Axial dimensions of the attaching portion 18 and the communication hole 16 are determined to be sufficient to prevent the breather plug 14 from being inclined relative to the casing 12 when the breather plug 14 is installed with its attaching portion 18 being fitted in the communication hole 16. The O-ring 24 corresponds to the sealing member of the invention.

The attaching portion 18 fitted in the communication hole 16 has a first communication hole 26 open to the inner space within the casing 12.

The body portion 20 of the breather plug 14 includes a projecting section 28 projecting in the vertical direction when the casing 12 has the predetermined posture, and a connecting section 30 connecting the projecting section 28 and the attaching portion 18. The projecting section 28 is a cylindrical section which projects in the vertical direction when the casing 12 has the predetermined posture. The projecting section 28 in the form of the cylindrical section has a large-diameter end part 32 having a larger diameter than the other part which projects radially outward. Further, the projecting section 28 has a second communication hole 34 which is open to the outside atmosphere at its upper end.

The connecting section 30 is interposed between the projecting section 28 and the attaching portion 18, to connect these projecting section 28 and the attaching portion 18 to each other. The connecting section 30 is a generally elongate section extending in the horizontal direction when the power transmitting device 10 is placed in its horizontal posture.

In the breather plug 14, the attaching portion 18 and the connecting section 30 are connected to each other, as an L-shaped structure, while the projecting section 28 and connecting section 30 are connected to each other, also as an L-shaped structure, as shown in FIG. 2. Thus, the breather plug 14 as a whole is a structure which consists of the attaching portion 18, the projecting section 28 and the connecting section 30 and which is bent at two points. Accordingly, the projecting section 28 and the attaching portion 18 are spaced apart from each other in the horizontal direction, namely, as seen in the vertical direction, when the casing 12 has the predetermined posture.

The connecting section 30 has a third communication hole 36 for communication between the first and second communication holes 26 and 34. Thus, the inner space within the casing 12 and the outside atmosphere outside the casing 12 are held in communication with each other through the breather plug 14, more specifically, through the first, second and third communication holes 26, 34 and 36 communicating with each other.

The breather plug 14 consists of a first member 38 and a second member 40 which are superposed on each other in a horizontal plane indicated by one-dot chain lines indicated in FIGS. 1 and 2. These first and second members 38 and 40 are integrally connected to each other by brazing, for example. At least one of the mutually contacting surfaces of the first and second members 38 and 40 has a groove defining the third communication hole 36 between these two members 38 and 40 when these two members 38 and 40 are joined each other. It is noted that the breather plug 14 is formed of a plastic or synthetic resin material.

The projecting section 28 is provided with a protective cap 42 covering its distal end part. The protective cap 42 is a cylindrical member which is closed at one of its opposite axial ends and open at the other axial end. A bottom wall at the closed axial end of the protective cap 42 is held in abutting contact with the corresponding open end face of the projecting section 28, so as to close the corresponding open end of the second communication hole 34. The projecting section 28 has slits (not shown) formed in its distal axial end part covered by the protective cap 42, so that the air is exhausted from the breather plug 14 into the outside atmosphere through the slits.

The bottom wall of the protective cap 42 is provided with pawls 46 engageable with the large-diameter end part 32 of the projecting section 28. The pawls 46 are brought into engagement with the large-diameter end part 32 of the projecting section 28 when the protective cap 42 is moved relative to the projecting section 28 in the upward direction, as seen in FIG. 1, so that removal of the protective cap 42 from the projecting section 28 is prevented. Further, the projecting section 28 projecting in the vertical direction prevents a discharge flow of an oil into the outside atmosphere through the open end of the second communication hole 34.

As shown in FIG. 1, the casing 12 is provided with a bracket 48 fixed thereto, which functions as a stationary removal preventive member fixed to the casing 12 for preventing removal of the breather plug 14 from the casing 12. The bracket 48 is positioned above the connecting section 30 of the body portion 20 of the breather plug 14. For example, the bracket 48 is a member used for fixing a shift cable (not shown) provided in the power transmitting device 10. In this respect, it is to be understood that the casing 12, the breather plug 14 and the bracket 48 constitute a casing structure of the vehicular power transmitting device 10, which casing structure is constructed according to the present embodiment of the invention. The bracket 48 is positioned relative to the breather plug 14 such that the bracket 48 overlaps a part of the connecting section 30, as seen in the vertical direction (as seen in the downward direction in the plane of FIG. 1). This part of the connecting section 30 serves as an abutting section 50. The bracket 48 is positioned to permit the connecting section 30 to be moved when the attaching portion 18 is moved relative to the communication hole 16 of the casing 12. The abutting section 50 of the connecting section 30 comes into abutting contact with the bracket 48 when the connecting section 30 is moved toward the bracket 48. The abutting section 50 has a flat upper surface opposed to the bracket 48.

According to the casing structure consisting of the casing 12, the breather plug 14 and the bracket 48, the abutting section 50 is brought into abutting contact with the bracket 48 when the attaching portion 18 of the breather plug 14 is moved relative to the communication hole 16 of the casing 12 in the upward direction, that is, in the direction away from the casing 12 toward the outside atmosphere. Further, the bracket 48 is positioned relative to the communication hole 16 such that the attaching portion 18 of the breather plug 14 is located to keep the breather plug 14 in communication with the communication hole 16 when the abutting section 50 of the body portion 20 comes into abutting contact with the bracket 48 in the vertical direction. Thus, when the attaching portion 18 is moved relative to the communication hole 16 in the vertical direction during running of the vehicle 8, the abutting section 50 of the body portion 20 is brought into abutting contact with the bracket 48, so that the removal of the breather plug 14 from the casing 12 is prevented. Accordingly, the breather plug 14 can be prevented from being removed from the casing 12, in spite of the attaching portion 18 of the breather plug 14 being merely fitted in the communication hole 16 of the casing 12. In this respect, it is noted that the breather plug 14 and the bracket 48 are assembled with respect to the casing 12, such that the bracket 48 is spaced apart from the abutting section 50 by a distance L in the vertical direction, as indicated in FIG. 1.

The bracket 48 which is fixed to the casing 12 is the member which is provided in the power transmitting device 10 to fix the shift cable (not shown) and which is not additionally or exclusively provided to prevent the breather plug 14 from being removed from the casing 12. It is noted that the bracket 48 is fixed to the casing 12 after the breather plug 14 is fixed to the casing 12.

In the casing structure of the power transmitting device 10 of the vehicle 8, which is constructed according to the present embodiment of the invention, the body portion 20 of the breather plug 14 includes the abutting section 50 which abuts on the stationary removal preventive member in the form of the bracket 48 when the attaching portion 18 of the breather plug 14 is moved relative to the communication hole 16 in the direction toward the outside atmosphere outside the casing 12. This bracket 48 is positioned relative to the communication hole 16 such that the attaching portion 18 of the breather plug 14 is located to keep the breather plug 14 in communication with the communication hole 16 when the abutting section 50 comes into abutting contact with the bracket 48. Accordingly, even when the breather plug 14 is moved relative to the communication hole 16 in the direction away from the communication hole 16, the breather plug 14 is prevented from being removed from the casing 12, owing to the abutting contact of the abutting section 50 of the body portion 18 of the breather plug 14 on the bracket 48. Thus, it is possible to prevent the removal of the breather plug 14 from the casing 12 of the vehicular power transmitting device 10, without a need of providing an exclusive mechanism between the attaching portion 18 of the breather plug 14 and the communication hole 16 of the casing 12.

The casing structure according to the present embodiment is further configured such that the abutting section 50 is located in the selected part of the connecting section 30 such that the abutting section 50 is abuttable on the bracket 48 when the attaching portion 18 is moved relative to the communication hole 16. Accordingly, the abutting section 50 comes into abutting contact with the bracket 48 when the breather plug 14 is moved relative to the communication hole 16 in the direction away from the communication hole 16, so that the breather plug 14 is prevented from being removed from the casing 12.

Further, the bracket 48 is the member which is provided in the power transmitting device 10 to fix the shift cable, for example, as described above, and which is not additionally or exclusively provided to prevent the breather plug 14 from being removed from the casing 12. Accordingly, the number of required components of the power transmitting device 10 is not increased to prevent removal of the breather plug 14 from the casing 12.

The casing structure according to the present embodiment is further configured such that the sealing member in the form of the O-ring 24 is interposed between the outer circumferential surface of the attaching portion 18 of the breather plug 14 and the inner circumferential surface of the communication hole 16, so that the attaching portion 18 is air-tightly held in communication with the communication hole 16.

While the preferred embodiment of this invention has been described above in detail by reference to the drawings, it is to be understood that the invention may be otherwise embodied.

In the illustrated embodiment, the projecting section 28 and the connecting section 30 of the body portion 20 of the breather plug 14 are connected to each other, as the L-shaped structure wherein the connecting section 30 provides the abutting section 50. However, the projecting section 28 and the connecting section 30 need not be formed as the L-shaped structure. Namely, the projecting section 28 and the connecting section 30 need not be connected to each other at an angle of 90°, but may be connected at an angle other than 90°, as long as the connecting portion 30 between the projecting section 28 and the attaching portion 18 has a part overlapping the bracket 48 in the vertical direction.

Further, the illustrated embodiment is configured such that the projecting section 28 of the body portion 20 of the breather plug 14 extends in the vertical direction when the casing 12 has the predetermined posture while the vehicle 8 is held stationary on a horizontal roadway or ground surface. However, the projecting section 28 may be inclined with respect to the vertical direction, as long as the breather plug 14 can function to perform the intended function.

The illustrated embodiment is also configured such that the attaching portion 18 fitted in the communication hole 16 extends in the vertical direction when the casing 12 has the predetermined posture. However, the attaching portion 18 may be inclined with respect to the vertical direction, as long as the breather plug 14 can function to perform the intended function. In this case, the bracket 48 is positioned such that the abutting section 50 of the connecting section 30 is abuttable on the bracket 48 when the attaching portion 18 is moved relative to the communication hole 16.

In the illustrated embodiment, the attaching portion 18 and the projecting section 28 of the body portion 20 are spaced apart from each other in the horizontal direction, with the connecting section 30 interposed between the attaching portion 18 and the projecting section 28. However, the breather plug 14 may be formed such that the attaching portion 18 and the projecting portion 28 partially overlap each other as seen in the vertical direction, as long as the connecting section 30 is interposed between the attaching portion 18 and the projecting section 28 such that the breather plug 14 has two bent parts between which an abutting section abuttable on a removal preventive member is provided.

Further, the connecting section 30 interposed between the attaching portion 18 and the projecting section 28 and having the abutting section 50 may be replaced by a flange member which is fixed to or formed with the body portion 20 and which is positioned such that the flange member overlaps the bracket 48 as seen in the vertical direction, namely, is abuttable on the bracket 48. In this case, the flange member has an abutting section abuttable on the bracket 48.

While the bracket 48 provided as the removal preventive member in the illustrated embodiment is the member to fix the shift cable used in the power transmitting device 10, the bracket 48 may be replaced by any other member such as a steel member used to mount the power transmitting device 10 on the vehicle 8. In this case, the steel member is fixed to the casing 12, as a removal preventive member, and constitutes a part of the casing structure according to the present invention. Further, the removal preventive member may be formed integrally with the casing 12.

In the illustrated embodiment, the connecting section 30 only partially overlaps the bracket 48 as seen in the vertical direction. However, an entirety of the connecting section 30 may overlap the bracket 48.

Further, the illustrated embodiment is configured such that the distal end part of the projecting section 28 of the body portion 20 of the breather plug 14 is covered by the protective cap 42 and has slits through which the air is exhausted from the breather plug 14 into the outside atmosphere. However, the protective cap 42 may be replaced by a disc member which is normally held in contact with the projecting section 28 under a suitable biasing force of a spring, such that the disc member closes the opening at the upper open end of the projecting section 28 i.e. the second communication hole 34. In this case, the air is exhausted through the opening, with the disc member being spaced apart from the upper open end against the biasing force.

Although the illustrated embodiment is configured such that the O-ring 24 is interposed as a sealing member between the outer circumferential surface of the attaching portion 18 and the inner circumferential surface of the communication hole 16, air-tightness between the attaching portion 18 and the communication hole 16 may be achieved by any other sealing means. For instance, a connected portion between an outer circumferential surface of the attaching portion 18 and the communication hole 16 may be covered with a sealing tape.

While the breather plug 14 is formed of a plastic or synthetic resin material in the illustrated embodiment, the breather plug 14 may be formed of a metallic material.

While the preferred embodiment and modifications have been described for illustrative purpose only, it is to be understood that the present invention may be embodied with various changes and improvements, which may occur to those skilled in the art.

NOMENCLATURE OF ELEMENTS

8: Vehicle
12: Casing
14: Breather plug
16: Communication hole
18: Attaching portion
20: Body portion
24: O-ring (Sealing member)
28: Projecting section 30: Connecting section
48: Bracket (Removal preventive member)
50: Abutting section

What is claimed is:

1. A casing structure of a vehicular power transmitting device, comprising:
   a casing;
   a breather plug through which an inside space within the casing is open to an outside atmosphere outside the casing; and
   a stationary removal preventive member for preventing removal of the breather plug from the casing,
   wherein the breather plug includes an attaching portion fitted in a communication hole which is formed through the casing, for communication between the inside space and the outside atmosphere, and a body portion located on an upper side of the communication hole and held in communication with the outside atmosphere when the attaching portion is attached in the communication hole, the body portion of the breather plug including an abutting section which overlaps the removal preventive member in a direction toward the outside atmosphere such that the abutting section abuts on the removal preventive member when the attaching portion of the breather plug is moved relative to the communication hole in the direction toward the outside atmosphere,
   and wherein the removal preventive member is spaced apart from the abutting section of the body portion of the breather plug, and a distance between the removal preventive member and the abutting section is shorter than a dimension of the attaching portion in the direction toward the outside atmosphere such that the breather plug is kept in communication with the communication hole when the abutting section of the body portion comes into abutting contact with the removal preventive member.

2. The casing structure according to claim 1, wherein the body portion of the breather plug includes a projecting section projecting from the casing,
   and a connecting section connecting the projecting section and the attaching portion,
   and wherein the removal preventive member is positioned so as to permit the connecting section to be moved when the attaching portion is moved relative to the communication hole, and the abutting section is located in a part of the connecting section such that the abutting section abuts on the removal preventive member when the attaching portion is moved relative to the communication hole.

3. The casing structure according to claim 2, wherein the removal preventive member is fixed to the casing.

4. The casing structure according to claim 3, wherein a sealing member is interposed between an outer circumferential surface of the attaching portion of the breather plug and an inner circumferential surface of the communication hole.

5. The casing structure according to claim 2, wherein a sealing member is interposed between an outer circumferential surface of the attaching portion of the breather plug and an inner circumferential surface of the communication hole.

6. The casing structure according to claim 2, wherein the projecting section of the body portion of the breather plug projects in an upward direction when the vehicular power transmitting device is installed in position on a vehicle.

7. The casing structure according to claim 1, wherein the removal preventive member is fixed to the casing.

8. The casing structure according to claim 7, wherein a sealing member is interposed between an outer circumferential surface of the attaching portion of the breather plug and an inner circumferential surface of the communication hole.

9. The casing structure according to claim 1, wherein a sealing member is interposed between an outer circumferential surface of the attaching portion of the breather plug and an inner circumferential surface of the communication hole.

10. The casing structure according to claim 1, wherein the attaching portion of the breather plug is fitted in the communication hole of the casing such that the attaching portion is movable relative to the communication hole.

11. The casing structure according to claim 1, wherein the removal preventive member is positioned relative to the communication hole on an outside atmosphere side in a direction of an axis of the communication hole.

12. The casing structure according to claim 1, wherein the attaching portion of the breather plug has an inside space side communication hole which is open to the inside space, and the body portion of the breather plug has an outside atmosphere side communication hole which communicates with the inside space side communication hole and is open to the outside atmosphere,
   and wherein the abutting section has a part of the outside atmosphere side communication hole.

* * * * *